(12) United States Patent
Wakamatsu

(10) Patent No.: US 7,138,808 B2
(45) Date of Patent: Nov. 21, 2006

(54) MOVABLE APPARATUS, A MEASURING APPARATUS, A CAPACITIVE DISTANCE SENSING APPARATUS, AND A POSITIONING DEVICE

(75) Inventor: Hideki Wakamatsu, Fukuoka (JP)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/984,716

(22) Filed: Nov. 9, 2004

(65) Prior Publication Data

US 2005/0118859 A1 Jun. 2, 2005

(30) Foreign Application Priority Data

Nov. 28, 2003 (JP) .............................. 2003-398840

(51) Int. Cl.
*G01R 27/26* (2006.01)
(52) U.S. Cl. ...................... 324/661; 324/662
(58) Field of Classification Search ............... 324/661, 324/662
See application file for complete search history.

(56) References Cited

U.S. PATENT DOCUMENTS 3,048,775 A 8/1962 Calvert ................... 324/61
3,626,287 A * 12/1971 Di Niro ................... 324/688
4,918,376 A 4/1990 Poduje et al. ............ 324/663
6,828,806 B1 * 12/2004 Hirota et al. ............. 324/688

FOREIGN PATENT DOCUMENTS

| JP | 05-087845 | 6/1993 |
| JP | 09-318671 | 12/1997 |
| WO | WO 97/28418 | 8/1997 |

OTHER PUBLICATIONS

Cascade Microtech, Inc., "The industry standard in on-wafer device characterization. Summit wafer probing systems," 2004.

* cited by examiner

Primary Examiner—Walter Benson

(57) ABSTRACT

The movable apparatus of a positioning device comprising a conductive stationary part and a conductive movable part, the stationary part has an electrode constituting a capacitor together with said movable part, and the electrode is covered by a guard electrode insulated from the stationary part, whereby a triaxial structure is formed around these electrodes.

13 Claims, 10 Drawing Sheets

MOVABLE APPARATUS, A MEASURING APPARATUS, A CAPACITIVE DISTANCE SENSING APPARATUS, AND A POSITIONING DEVICE

FIELD OF THE INVENTION

The present invention pertains to a device that very precisely positions an object by measuring changes in electrostatic capacity.

DISCUSSION OF THE BACKGROUND ART

A positioning device that uses an electrostatic capacitive distance sensing apparatus is a device capable of very precise positioning of the subject of positioning. The general structure of this positioning device is shown in FIG. 1. FIG. 1 is referred to below. A conventional positioning device 100 that uses an electrostatic capacitive distance sensing apparatus comprises a moveable apparatus 200 comprising a stationary part (not illustrated) and a moveable part (not illustrated); an electrostatic capacitive distance sensing apparatus 300; a drive apparatus 400 for driving this moveable part in order to move the subject of positioning; and a control part 500 for controlling drive apparatus 400 based on the actual distance of movement of this moveable part measured by electrostatic capacitive distance sensing apparatus 300. Moveable apparatus 200 comprises two electrodes constituting a capacitor for measuring the distance of movement of an object. This moveable part connects with the subject of positioning. Movement of this movable part changes the distance between these two electrodes and changes the electrostatic capacity of this capacitor. Changes in this electrostatic capacity are measured by electrostatic capacitive distance sensing apparatus 300.

Electrostatic capacity can be converted to voltage using a capacity-voltage conversion circuit. There are two types of capacity-voltage converters and they differ in terms of the voltage conversion method. These types of capacity-voltage conversion circuits are shown in FIG. 2 and FIG. 3.

Capacity-voltage conversion circuit 310 shown in FIG. 2 measures the voltage proportional to the electrostatic capacity of the capacitor and inversely proportional to the distance d1 between electrodes. A signal source 311 in FIG. 2 is connected to one terminal of a capacitor 240 with a coaxial cable 250 in between. When it is unknown, the output voltage of signal source 311 is measured by a voltmeter 315. The other terminal of capacitor 240 is connected to the inverted input terminal of an amplifier 312 with a coaxial cable 260 in between. Amplifier 312 is the device that amplifies A-times the potential of the noninverted input terminal versus the inverted input terminal and outputs that potential, and the voltage is output such that the potential difference between the noninverted input terminal and the inverted input terminal becomes zero. The noninverted input terminal of amplifier 312 is connected to the reference potential. A reference capacitor 313 is connected in between the inverted input terminal and the output terminal of amplifier 312 and current flowing to capacitor 240 is converted to voltage. In addition, the output voltage of amplifier 312 is measured by a voltmeter 314. Voltage V1 measured by voltmeter 314 is as in the following formula. $V1=-(Cs1/Cr1)\cdot E1$. Cs1 here is the capacity of capacitor 240. Cr1 is the capacity of reference capacitor 313. E1 is the output voltage of signal source 311. Cs1 is inversely proportional to the distance d1 between electrodes and therefore, V1 is also inversely proportional to the distance d1 between electrodes.

The letter A entered in amplifier 312 is the amplification factor of amplifier 312, and this amplification factor is extremely large at the measured frequency point or the measured frequency band. The inverted triangles in the figure show the reference potential of the circuit.

A capacity-voltage conversion circuit 320 in FIG. 3 measures the voltage inversely proportional to the electrostatic capacity of this capacitor and proportional to the distance d1 between electrodes. A signal source 321 in FIG. 3 is connected to the inverted input terminal of an amplifier 322 with a reference capacitor 323 in between. When it is unknown, the output voltage of signal source 321 is measured by a voltmeter 325. Amplifier 322 is the device that amplifies A-times the potential of the noninverted input terminal versus the inverted input terminal and outputs that potential, and the voltage is output such that the potential difference between the noninverted input terminal and the inverted input terminal becomes zero. The noninverted input terminal of amplifier 322 is connected to the reference potential. The output voltage of amplifier 322 is measured by a voltmeter 324. One terminal of a capacitor 240 is connected to the inverted input terminal of amplifier 322 with a coaxial cable 250 in between, and the other terminal is connected to the output terminal of amplifier 322 with a coaxial cable 260 in between. Voltage V2 measured by voltmeter 324 is as in the following formula. $V2=-(Cr2/Cs1)\cdot E2$. Cs1 here is the capacity of capacitor 240. Cr2 is the capacity of reference capacitor 323. E2 is the output voltage of signal source 321. Cs1 is inversely proportional to the distance between electrodes d1 and therefore, V2 is also proportional to the distance between electrodes d1. The letter A entered in amplifier 322 is the amplification factor of amplifier 322, and this amplification factor is extremely large at the measured frequency point or the measured frequency band. The inverted triangles in the figure show the reference potential of the circuit.

Electrostatic capacitive distance sensing apparatus 300 is capable of measuring the actual movement distance of this moveable part when it comprises either capacity-voltage conversion circuit 310 or capacity-voltage conversion circuit 320. Inverse operations are not necessary with capacity-voltage conversion circuit 320 and therefore, it is a convenient electrostatic capacitive distance sensing apparatus.

Capacity-voltage conversion circuit 310 and capacity-voltage conversion circuit 320 both require that capacitor 240 is insulated from the reference potential. Moveable apparatus 200 comprises two electrodes that constitute capacitor 240. Consequently, moveable apparatus 200 comprises two electrodes insulated from the reference potential. Moveable apparatus 200 will be described here while referring to FIGS. 4 through 7. FIG. 4 is an oblique view of moveable apparatus 200. Moveable apparatus 200 comprises a stationary part 210 and a moveable part 220. Moveable part 220 can move in the direction shown by arrow D1. Stationary part 210 and moveable part 220 are connected by a spring 230. Moreover, capacitor 240 is formed between a face 211 of stationary part 210 and a face 221 of moveable part 220. Coaxial cable 250 and coaxial cable 260 are connected to capacitor 240.

Next, FIG. 5 is face 211 of stationary part 210 seen from the front. FIG. 6 is face 221 of moveable part 220 seen from the front. In FIG. 5, face 211 comprises an electrode 241 with an insulator 242 in between. Moreover, in FIG. 6, face 221 comprises an electrode 243 with an insulator 244 in between.

Next, the A–A' cross section of FIG. 4 is shown in FIG. 7. The structural elements in FIG. 7 that are the same as in FIGS. 4, 5, or 6 are shown by the same numbers and a detailed description thereof has been omitted. Moveable apparatus 200 in FIG. 7 comprises drive apparatus 400. Moveable apparatus 220 is driven by drive apparatus 400 and is capable of moving in the direction shown by arrow D1. As is clear from FIGS. 5 through 7, electrodes 241 and 243 constituting capacitor 240 are insulated from the reference potential.

The present inventors have discovered that electrode 241 and electrode 243 constituting capacitor 240 must be as close to one another as possible in order to very accurately measure any minute displacement of the moveable part of movable apparatus 200. This is because the S/N ratio of electrostatic capacitive distance sensing apparatus 300 decreases with a reduction in capacity Cs1 of capacitor 240. In terms of the S/N ratio, it is preferred that capacity Cs1 is at least several pF. Moreover, if electrode 241 and electrode 243 are close to one another, there is also an advantage in that changes in capacity Cs1 can be easily monitored. For instance, when the range of movement of moveable part 220 is 20 micrometers and electrode 241 and electrode 243 are disc-shaped electrodes with a diameter of 5 millimeters, electrode 241 and electrode 243 should face one another at a distance between electrodes of several micrometers to 10 micrometers. Electrode 241 and electrode 243 supported by insulators are not easily positioned parallel to one other with such a small distance in between. Moreover, even if it is flexible, coaxial cable 260 is a factor that interferes dynamically with the movement of moveable part 220. Furthermore, the force applied by coaxial cable 260 to moveable part 220 when coaxial cable 260 bends is not reproducible. Therefore, there is a problem with conventional positioning devices in that positioning errors are large.

The present invention provides a positioning device with a smaller positioning error than conventional devices. Additionally, the present invention provides a moveable apparatus with which dimensional uncertainty is reduced by making it possible to ground one of the two electrodes and eliminating the insulators that support the electrodes. The present invention also provides a distance sensing apparatus suitable for this type of moveable apparatus. Furthermore, the present invention reduces the cost of the positioning device.

SUMMARY OF THE INVENTION

The present invention is characterized in that it is a moveable apparatus comprising a stationary part and a movable part; this movable part comprises a first electrode that constitutes a capacitor; this stationary part comprises a second electrode that constitutes this capacitor; and this second electrode is enclosed in a guard electrode with a first insulator in between and is such that it can detect the amount of movement of this moveable part from changes in the electrostatic capacity of this capacitor. The moveable apparatus comprises a drive source for driving this moveable part.

The moveable apparatus is preferably connected to one terminal of a triaxial cable comprising a first or core conductor, a second conductor covering this first conductor, and a third conductor covering this second conductor; this first electrode is made such that it can be connected to this third conductor; this second electrode is made such that it can be connected to this first conductor; and this guard electrode is made such that it can be connected to this second conductor.

The stationary part of the moveable apparatus comprises a fourth conductor and this fourth conductor is insulated from this guard electrode and is electrically connected to this first electrode.

The moveable apparatus is connected to one terminal of a triaxial cable comprising a first or core conductor, a second conductor covering this first conductor, and a third conductor covering this second conductor; this first electrode is made such that it can be connected to this third conductor; this second electrode made is such that it can be connected to this first conductor; this guard electrode is made such that it can be connected to this second conductor; and this fourth electrode is made such that it can be connected to this third conductor. The stationary part of the moveable apparatus supports this moveable part with a conductive support means for electrically connecting this fourth conductor and this first electrode.

Furthermore, the moveable apparatus encloses the above-mentioned guard electrode with a second insulator in between. The second electrode, guard electrode, and fourth conductor of the moveable apparatus are made such that they form a triaxial structure.

The first electrode of the moveable apparatus is the moveable part, at least part of which is formed from a conductor.

The present invention also pertains to a measuring apparatus connected to one terminal of a triaxial cable comprising a first or core conductor, a second conductor covering this first conductor, and a third conductor covering this second conductor, with a device under test being connected between the first conductor and third conductor at the other terminal of the triaxial cable; and it comprises a reference impedance component between the first conductor and the second conductor of one terminal of this triaxial cable, a signal generation means between this reference impedance component and the second conductor of one terminal of this triaxial cable, a voltage generation means between the second conductor and the third conductor of one terminal of this triaxial cable for controlling the output voltage such that the potential difference between the first conductor and the second conductor of one terminal of this triaxial cable is zero, and a first voltage measuring means between the second conductor and the third conductor of one end of this triaxial cable. The third conductor of the triaxial cable of this measuring apparatus is grounded. The measuring apparatus also comprises a second voltage measuring means for measuring the output voltage of this signal generation means.

The present invention also pertains to an electrostatic capacitive distance sensing apparatus connected to one terminal of a triaxial cable comprising a first or core conductor, a second conductor covering this first conductor, and a third conductor covering this second conductor, with a capacitor being connected in between the first conductor and the third conductor at the other terminal of this triaxial cable; it comprises a reference impedance component in between the first conductor and the second conductor of one terminal of this triaxial cable, a signal generation means between this reference impedance component and the second conductor of one terminal of this triaxial cable, a voltage generation means between the second conductor and the third conductor of one terminal of this triaxial cable for controlling the output voltage such that the potential difference between the first conductor and the second conductor of one terminal of this triaxial cable is zero, and a first voltage measuring means between the second conductor and the third conductor of one terminal of this triaxial cable; and it is such that the voltage that corresponds to the distance between the electrodes constituting this capacitor can be detected. The third conductor of this triaxial cable of the electrostatic capacitive distance sensing apparatus is grounded.

The electrostatic capacitive distance sensing apparatus also comprises a second voltage measuring means for measuring the output voltage of this signal generating means.

The reference impedance of the electrostatic capacitive distance sensing apparatus is a reference capacitor.

Another embodiment according to the present invention is a positioning apparatus characterized in that it comprises the aforementioned moveable apparatus.

A positioning apparatus characterized in that it comprises the aforementioned moveable apparatus and aforementioned electrostatic capacitive distance sensing apparatus.

The present invention also relates to a positioning device that comprises a movable mechanism connected to the first end of a triaxial cable, which comprises a first core conductor, a second conductor covering this first conductor, and a third conductor covering this second conductor, and a capacitive distance sensing apparatus, wherein the movable mechanism comprises a movable part having a first electrode that forms a capacitor and a stationary part having a second electrode that forms the capacitor, wherein the second electrode is enclosed by a guard electrode with a first insulator in between, wherein the first electrode is connected to the third conductor at a first end, wherein the second electrode is connected to the first conductor at a first end, wherein the guard electrode is connected to the second conductor at a first end, wherein the capacitive distance sensing apparatus comprises a standard impedance component between the first conductor and the second conductor at a second end, a signal generator disposed between the standard impedance component and the second conductor at the second end, a voltage generator that controls the output voltage so that a potential difference between the first conductor and the second conductor at the second end is brought to zero in between the second conductor and the third conductor at a second end, and a voltage measurement unit disposed between the second conductor and the third conductor at a second end, and wherein the positioning device is such that a voltage corresponding to the distance between the first electrode and the second electrode can be detected. Optionally, the stationary part comprises a fourth conductor which is insulated from the guard electrode and electrically connected to the first electrode, and wherein the stationary party is connected to the third conductor at the second end.

DETAILED DESCRIPTION OF THE PREFERRED EMBODIMENT

The electrodes supported by an insulator are reduced from two to one by the present invention and therefore, the dimensional uncertainty of the movable apparatus can be reduced. As a result, the movable apparatus is easily assembled such that the electrodes are kept reasonably parallel. Moreover, the electrodes can also be reduced from two to one by the present invention and therefore, the cost of the movable apparatus can be reduced. It is not necessary to connect a coaxial cable to the movable part of the movable apparatus of the present invention and therefore the movable part of the movable apparatus moves more smoothly than in the past. In addition, the present invention provides an electrostatic capacitive distance sensing apparatus that is used with the above-mentioned movable apparatus of the present invention. One of the electrostatic capacitive distance sensing apparatuses of the present invention does not require inverse operations and therefore can be realized with a simple circuit structure. Moreover, because of the above-mentioned effects, the positioning errors and the cost of the positioning device of the present invention are reduced when compared to conventional devices.

Figure 1:
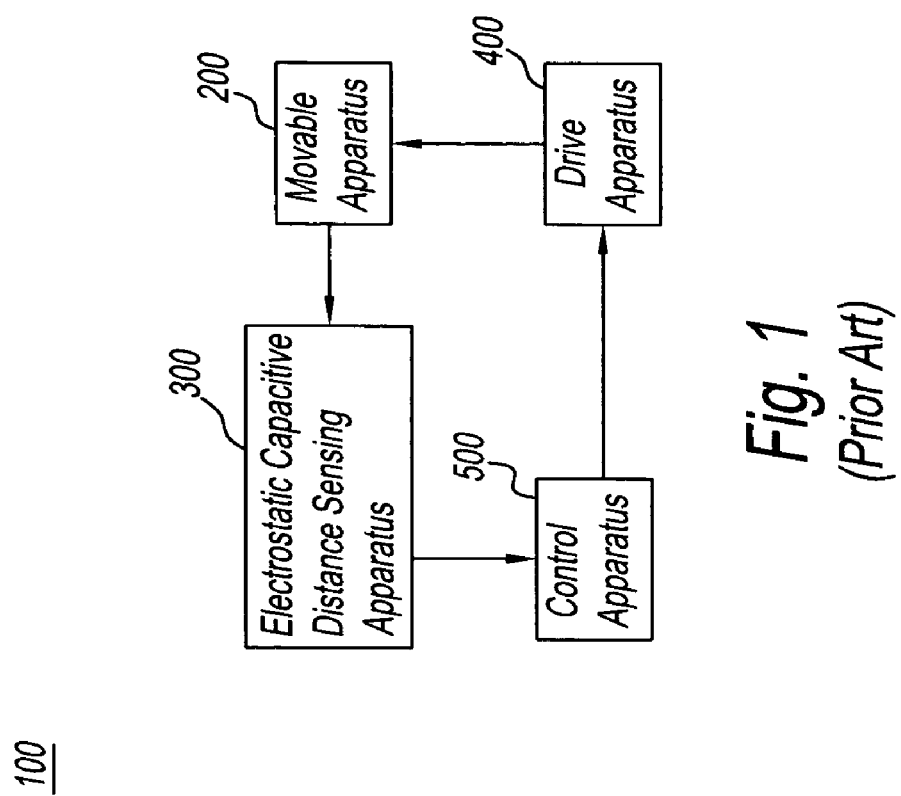
FIG. 1 is a block diagram showing conventional positioning device 100.
Figure 8:
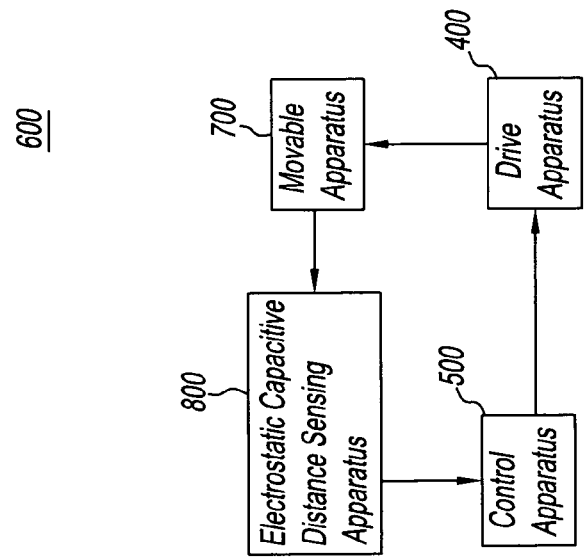
FIG. 8 is a block diagram showing positioning device 600 of the present invention.
Figure 7:
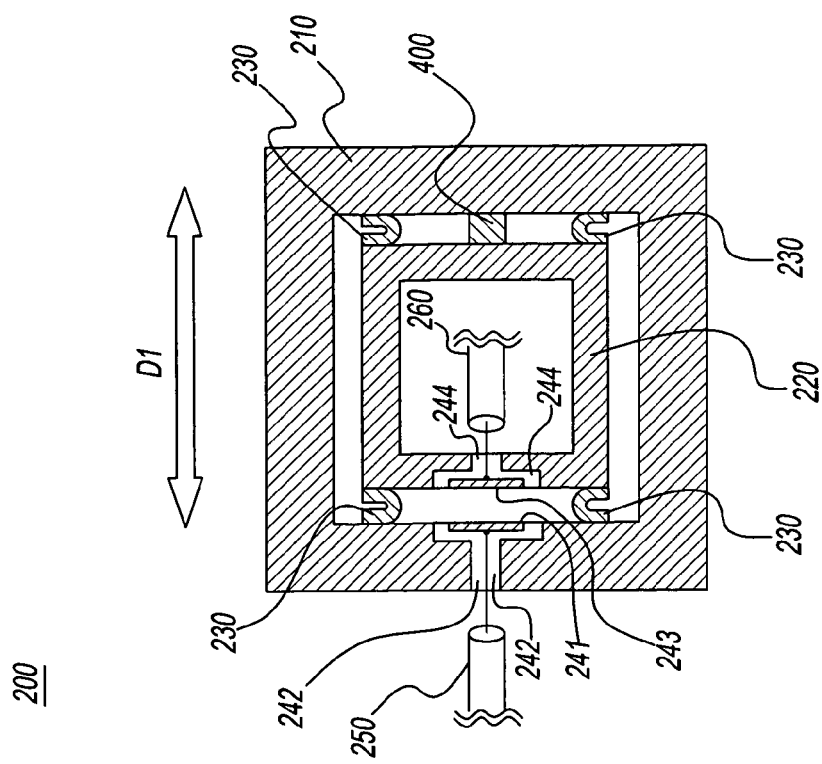
FIG. 7 is the A–A' cross section of FIG. 4.

The present invention will now be described in detail based on embodiments shown in the attached drawings. The first embodiment of the present invention is a positioning device that uses an electrostatic capacitive distance sensing apparatus, and a block diagram thereof is shown in FIG. 8. A positioning device 600 in FIG. 8 comprises a movable apparatus 700, which in turn comprises a stationary part 710 (not illustrated) and a moveable part 720 (not illustrated); an electrostatic capacitive distance sensing apparatus 800 for sensing the movement distance of moveable part 720; a drive apparatus 400 for driving movable part 720 in order to move the subject of positioning; and a control apparatus 500 for controlling drive apparatus 400 based on the actual movement distance of moveable part 720 as measured by the electrostatic capacitive distance sensing apparatus. Drive apparatus 400 and control apparatus 500 are the same as in FIG. 1.

Figure 9:
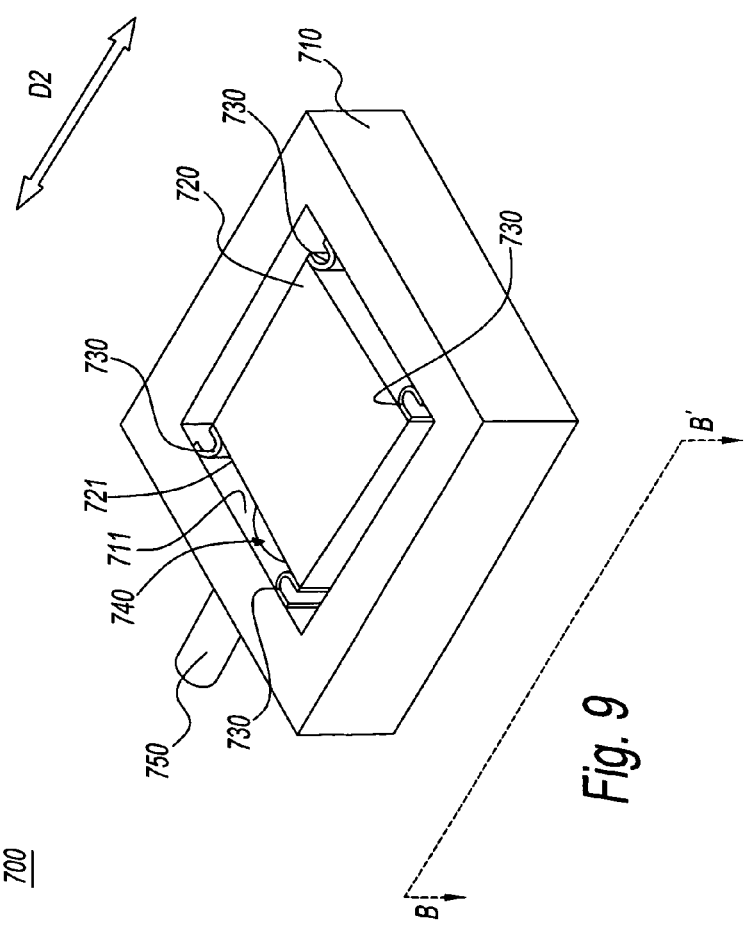
FIG. 9 is an oblique view showing movable apparatus 700 of the present invention.

Movable apparatus 700 will now be described while referring to FIGS. 9 through 12. FIG. 9 is an oblique view of movable apparatus 700. Movable apparatus 700 in FIG. 9 comprises stationary part 710 and movable part 720. Stationary part 710 and movable part 720 are conductors. Movable part 720 can move in the direction shown by arrow D2. Stationary part 710 supports movable part 720 with a conductive support means 730. Support means 730 is, for instance, a bearing, spring, or flat spring. Stationary part 710 and movable part 720 are electrically connected by support means 730. Moreover, a capacitor 740 is formed between a face 711 of stationary part 710 and a face 721 of movable part 720. A triaxial cable 750 connects capacitor 740. The triaxial cable is a coaxial cable comprising a first or core conductor; a second conductor covering this first conductor; and a third conductor covering this second conductor. In the present Specification the first conductor of the triaxial cable is called the core conductor, the second conductor of the triaxial cable is called the inner conductor, and the third conductor of the triaxial cable is called the outer conductor.

Figure 10:
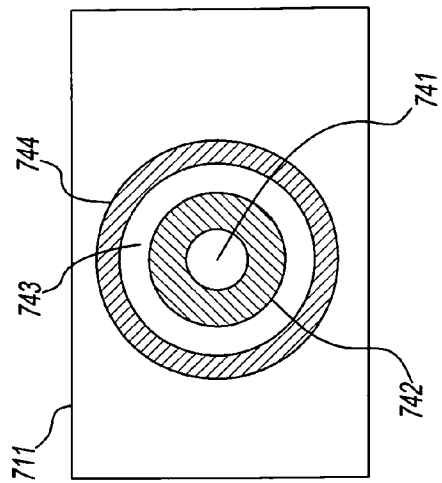
FIG. 10 is a drawing showing part of movable apparatus 700 of the present invention.
Figure 11:
FIG. 11 is a drawing showing part of movable apparatus 700 of the present invention.

FIG. 10 is the face 711 of stationary part 710 shown from the front and FIG. 11 is face 721 of movable part 720 shown from the front. Face 711 in FIG. 10 comprises an electrode 741 that, together with face 721, constitutes capacitor 740. Electrode 741 is enclosed inside a guard electrode 743 with an insulator 742 in between. Moreover, guard electrode 743 is enclosed in stationary part 710 with an insulator 744 in between. Electrode 741, insulator 742, guard electrode 743, and insulator 744 are preferably concentric circles as shown in the drawing, but they are not limited to concentric circles. For instance, insulator 744 can be rectangular. Moreover, the entire face of face 721 in FIG. 11 is a conductor and functions as an electrode of the capacitor. Only the part of face 721 facing electrode 741 is a conductor and therefore, the conductor portion can function as an electrode. In this case, this conductor portion must be electrically connected to stationary part 710.

Figure 12:
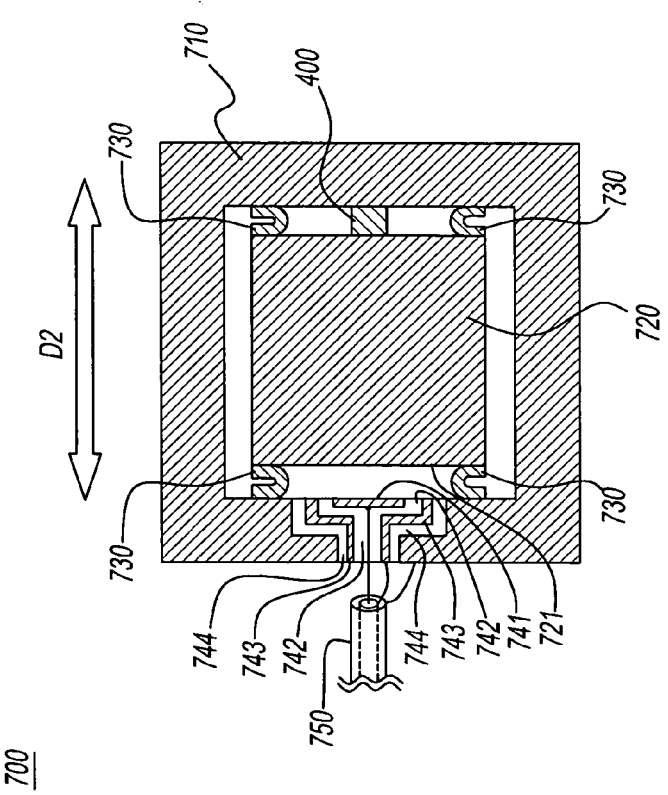
FIG. 12 is the B–B' cross section of FIG. 9.

The B–B' cross section in FIG. 9 is shown in FIG. 12. The structural elements in FIG. 12 that are the same as in FIGS. 9, 10, or 11 are shown by the same numbers and a detailed description thereof has been omitted. Movable apparatus 700 in FIG. 12 comprises drive apparatus 400. Drive apparatus 400, for instance, is a piezo actuator. Movable part 720 is driven by drive apparatus 400 and can move in the direction shown by arrow D2. As is clear from FIGS. 9 through 12, electrode 741 is covered by guard electrode 743 with insulator 742 in between. Moreover, guard electrode 743 is covered by stationary part 710 with insulator 744 in between. That is, it can also be said that a triaxial structure is formed near electrode 741 of stationary part 710. It should be noted that while this triaxial structure is preferred, it is not essential. Guard electrode 743 should enclose electrode 741 in order to minimize as much as possible the electrostatic capacity produced between electrode 741 and the electric path (stationary part 710 and flat spring 730 in the present embodiment) that joins movable part 720, which is a conductor, and the outer conductor of the triaxial cable.

Electrostatic capacitive distance sensing apparatus 800 will now be described. Electrostatic capacitive distance sensing apparatus 800 comprises a circuit that converts changes in electrostatic capacity of capacitor 740 to changes in voltage. There are two types of capacity-voltage conversion circuits that can be connected to the movable apparatus made as described above depending on the method that will be used to convert capacity to voltage. Each type of capacity-voltage conversion circuit, that is, a capacity-voltage conversion circuit 820 and a capacity-voltage conversion circuit 830, will be described.

Figure 2:
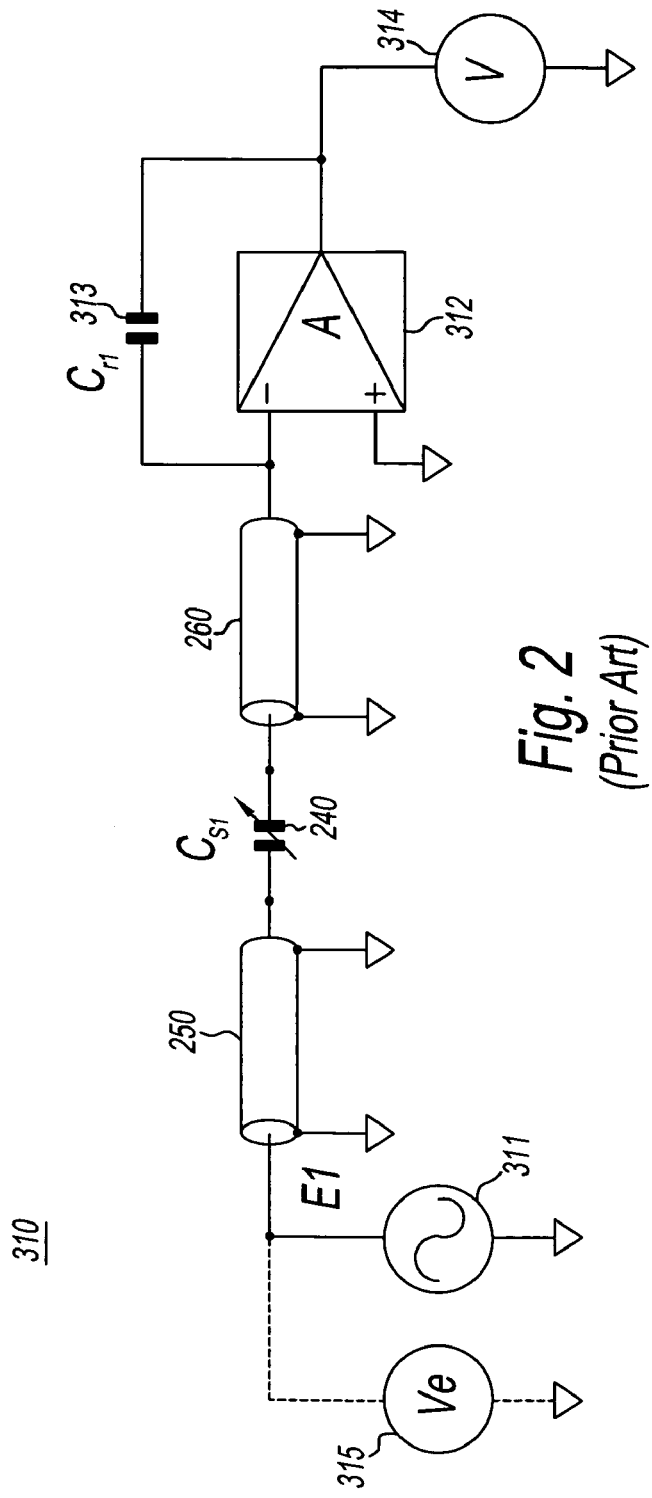
FIG. 2 is a drawing showing conventional capacity-voltage conversion circuit 310.
Figure 3:
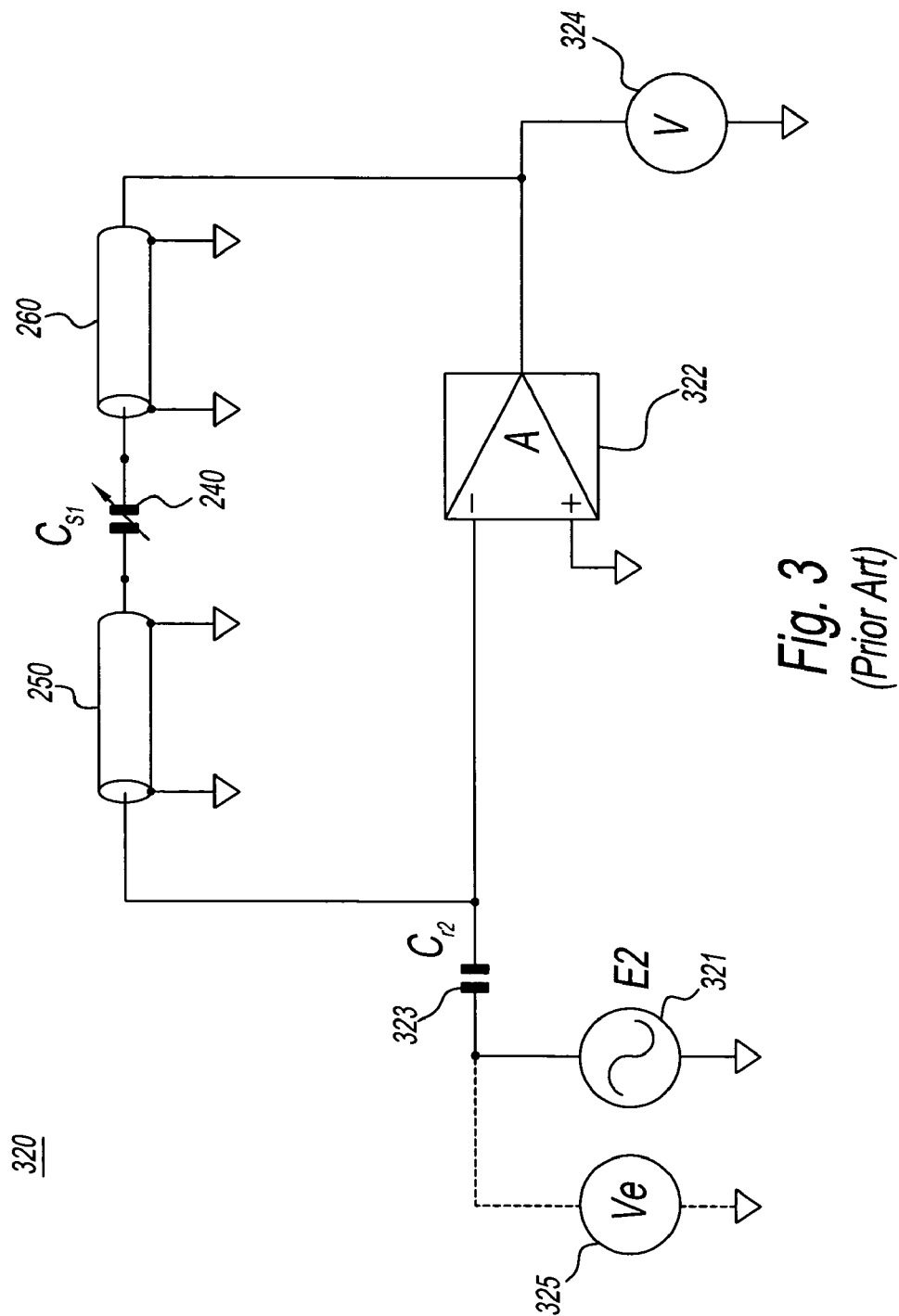
FIG. 3 is a drawing showing conventional capacity-voltage conversion circuit 320.
Figure 5:
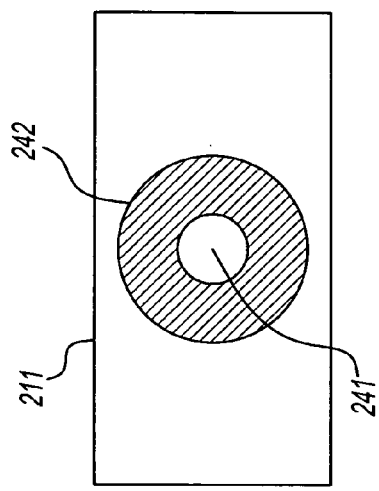
FIG. 5 is a drawing showing part of conventional movable apparatus 200.
Figure 6:
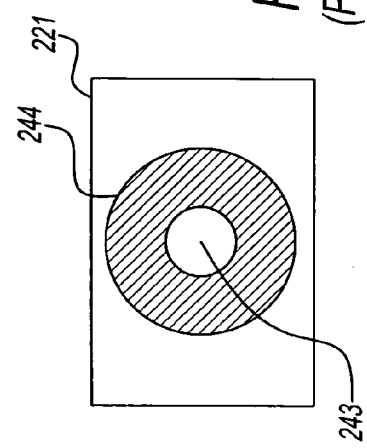
FIG. 6 is a drawing showing part of conventional movable apparatus 200.
Figure 4:
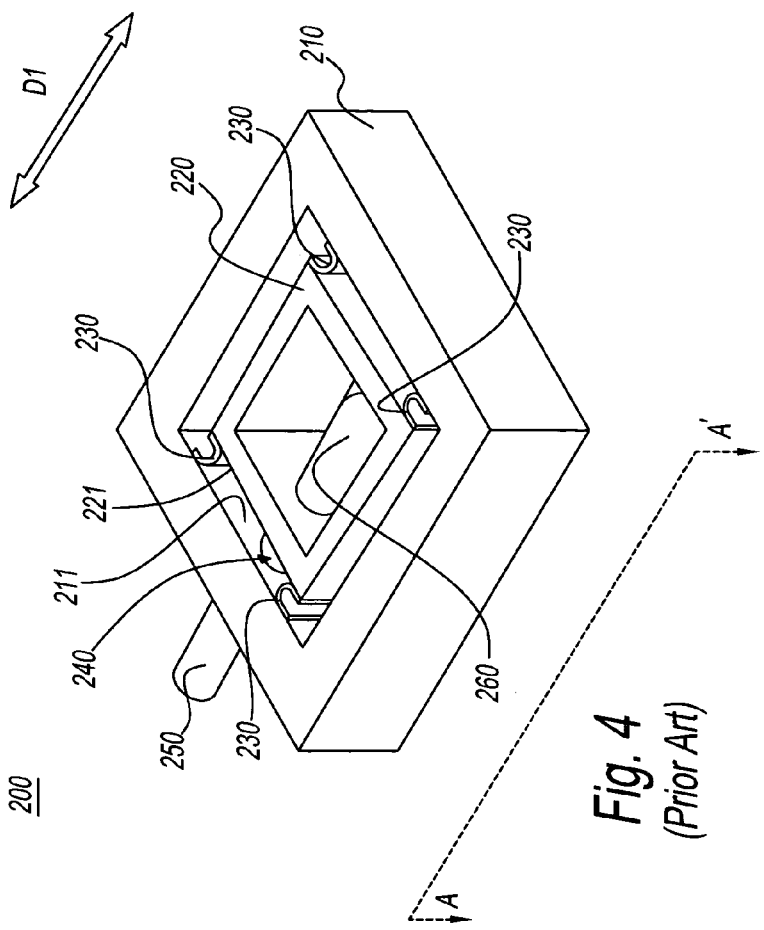
FIG. 4 is an oblique view showing conventional movable apparatus 200.
Figure 13:
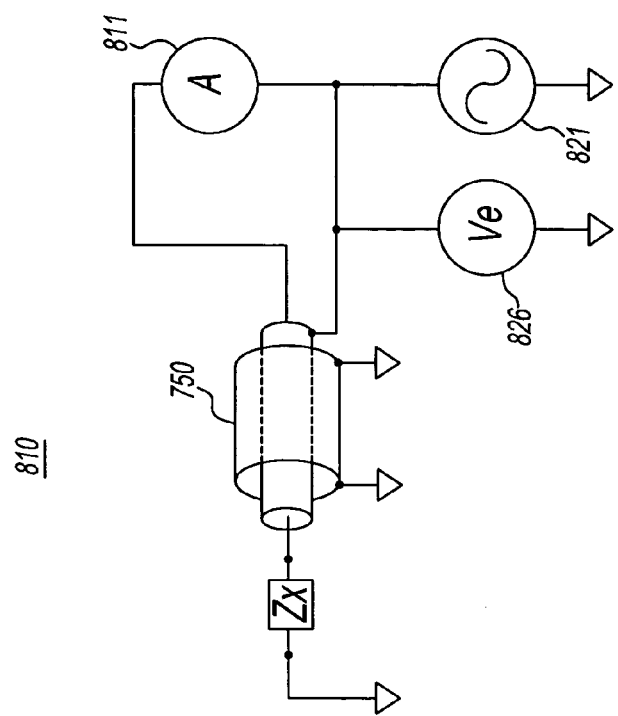
FIG. 13 is a drawing showing impedance measuring apparatus 810.

First, before describing capacity-voltage conversion circuit 820, the impedance measuring apparatus will be briefly described. Capacity measurement is a type of impedance measurement. Impedance of a device under test, one end of which is connected to a reference potential, can be measured by the measuring apparatus cited in FIG. 2(B) of Pat. No. 3,101,024. The structure of this measuring apparatus is shown here in FIG. 13. Measuring apparatus 810 in FIG. 13 comprises a triaxial cable 750; a signal source 821; a voltmeter 826; and an ammeter 811. Device under test Zx is connected between the core conductor and the outer conductor of one terminal of triaxial cable 750. Moreover, signal source 821 and voltmeter 826 are connected in parallel between the outer conductor and the inner conductor of the other terminal of triaxial cable 750. Ammeter 811 is connected between the core conductor and the inner conductor of the other terminal of triaxial cable 750. The inverted triangles in the figure show the reference potential of the circuit. Ammeter 811 in FIG. 13 floats from the reference potential. Ammeter 811 can be connected to the reference potential by setting the frequency of the measurement signals output by signal source 811 at several 10 kHz or higher and using a balun.

Figure 15:
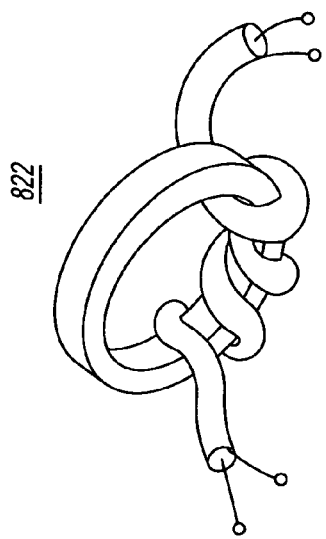
FIG. 15 is a drawing showing an example of a balun.
Figure 14:
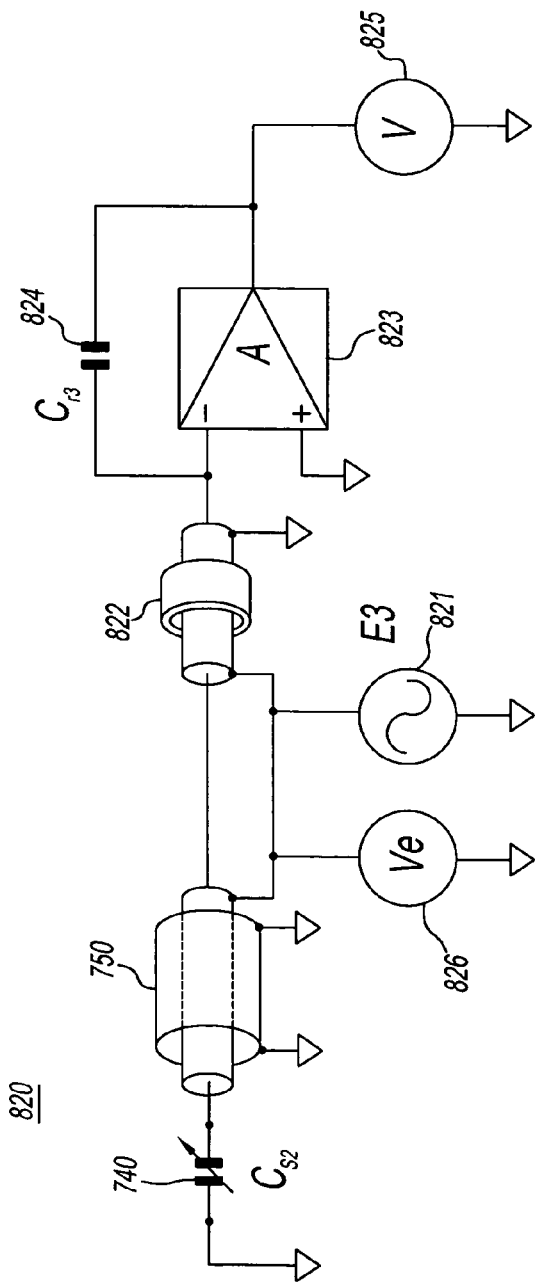
FIG. 14 is a drawing showing capacity-voltage conversion circuit 820 of the present invention.

Refer to FIG. 14. The circuit shown in FIG. 14 is an example of measuring apparatus 810 in FIG. 13 embodied as a capacity-voltage conversion circuit, and is capacity-voltage conversion circuit 820. Capacity-voltage conversion circuit 820 shown in FIG. 14 measures the voltage proportional to electrostatic capacity Cs2 of capacitor 740 and inversely proportional to the distance d2 between electrodes. Capacity-voltage conversion circuit 820 in FIG. 14 comprises triaxial cable 750; signal source 821; a balun 822; an amplifier 823; a reference capacitor 824; and a voltmeter 825. The inverted triangles in the figure show the reference potential of the circuit. The reference potential in the present embodiment is a grounded potential, but the reference potential is not necessarily grounded. Balun 822 has a structure wherein, for instance, a coaxial cable is wound several turns to several tens of turns around a toroidal core with a high magnetic permeability (refer to FIG. 15), and has a high excitation impedance of at least 100 ohms. Capacitor 740 is connected in between the core conductor and the outer conductor of one terminal of triaxial cable 750. Moreover, signal source 821 is connected in between the outer conductor and the inner conductor of the other terminal of triaxial cable 750. If it is unknown, the output voltage of signal source 821 is measured by voltmeter 826. The core conductor of the other terminal of triaxial cable 750 is connected to the core conductor of one terminal of balun 822. The inner conductor of the other terminal of triaxial cable 750 is connected to the outer conductor of one terminal of balun 822. The outer conductors at either terminal of triaxial cable 750 are connected to the reference potential. The core conductor at the other terminal of balun 822 is connected to the inverted input terminal of amplifier 823. Moreover, the outer conductor of the other terminal of balun 822 is connected to the reference potential. Amplifier 823 is the device that amplifies A-times the potential of the noninverted input terminal versus the inverted input terminal and outputs that potential, and the voltage is output such that the potential difference between the noninverted input terminal and the inverted input terminal becomes zero. The noninverted input terminal of amplifier 823 is connected to the reference potential. Amplifier 823 is connected to reference capacitor 824 between the inverted input terminal and the output terminal and the current flowing to capacitor 740 is converted to voltage. The output voltage V3 of amplifier 823 is measured by voltmeter 825. Voltage V3 measured by voltmeter 825 is as in the following formula: $V3=(Cs2/Cr3)\cdot E3$. Cs2 here is the capacity of capacitor 740. Cr3 is the capacity of reference capacitor 824. E3 is the output voltage of signal source 821. Cs2 is inversely proportional to the distance d1 between electrodes and therefore, V3 is also inversely proportional to the distance d1 between electrodes. The letter A entered in amplifier 823 is the amplification factor of amplifier 823, and this amplification factor is extremely large at the measured frequency point or the measured frequency band.

Capacity-voltage conversion circuit 830 will now be described. Capacity-voltage conversion circuit 830 shown in FIG. 16 measures the voltage inversely proportional to electrostatic capacity Cs2 of capacitor 740 and proportional to the distance d2 between electrodes. Capacity-voltage conversion circuit 830 in FIG. 16 comprises triaxial cable 750; a balun 831; an amplifier 832; a voltmeter 833; a reference capacitor 834; a signal source 835; and a voltmeter 836. The inverted triangles in the figure show the reference potential of the circuit. The reference potential in the present embodiment is a grounded potential, but the reference potential is not necessarily grounded. Balun 831 has a structure wherein, for instance, a coaxial cable is wound several turns to several tens of turns around a toroidal core with a high magnetic permeability (refer to FIG. 15), and has a high excitation impedance of at least 100 ohms. Capacitor 740 is connected between the core conductor and the outer conductor of one terminal of triaxial cable 750. The core conductor of the other terminal of triaxial cable 750 is connected to the core conductor of one terminal of balun 831. The inner conductor of the other terminal of triaxial cable 750 is connected to the outer conductor of one terminal of balun 831. The outer conductors at either terminal of triaxial cable 750 are connected to the reference potential. The core conductor at the other terminal of balun 831 is connected to the noninverted input terminal of amplifier 832. Moreover, the outer conductor of the other terminal of balun 821 is connected to the reference potential. Amplifier 832 is the device that amplifies A-times the potential of the noninverted input terminal versus the inverted input terminal and outputs that potential, and the voltage is output such that the potential difference between the noninverted input terminal and the inverted input terminal becomes zero. The inverted input terminal of amplifier 832 is connected to the reference potential. Reference capacitor 834 is placed in between the noninverted input terminal amplifier 832 and the reference potential. Signal source 835 is placed in between reference capacitor 834 and the reference potential. Moreover, the output terminal of amplifier 832 is connected to the inner conductor of the other terminal of triaxial cable 750. When the output voltage of signal source 835 is unknown, it is measured by voltmeter 836. Moreover, the output voltage V4 of amplifier 832 is measured by voltmeter 833. Voltage V4 measured by voltmeter 833 is as in the following formula. $V4=(Cr4/Cs2) \cdot E4$. Cs2 here is the capacity of capacitor 740. Cr4 is the capacity of reference capacitor 834. E4 is the output voltage of signal source 835. Cs2 is inversely proportional to the distance d2 between electrodes and therefore, V4 is also proportional to the distance d2 between electrodes. The letter A entered in amplifier 832 is the amplification factor of amplifier 832, and this amplification factor is extremely large at the measured frequency point or the measured frequency band.

Electrostatic capacitive distance sensing apparatus 800 is capable of measuring the actual movement distance of movable part 720 because it comprises either capacity-voltage conversion circuit 820 or capacity-voltage conversion circuit 830. Capacity-voltage conversion circuit 830 does not require inverse operations and therefore, it can be realized without a computer and is more convenient to use as an electrostatic capacitive distance sensing apparatus.

Figure 16:
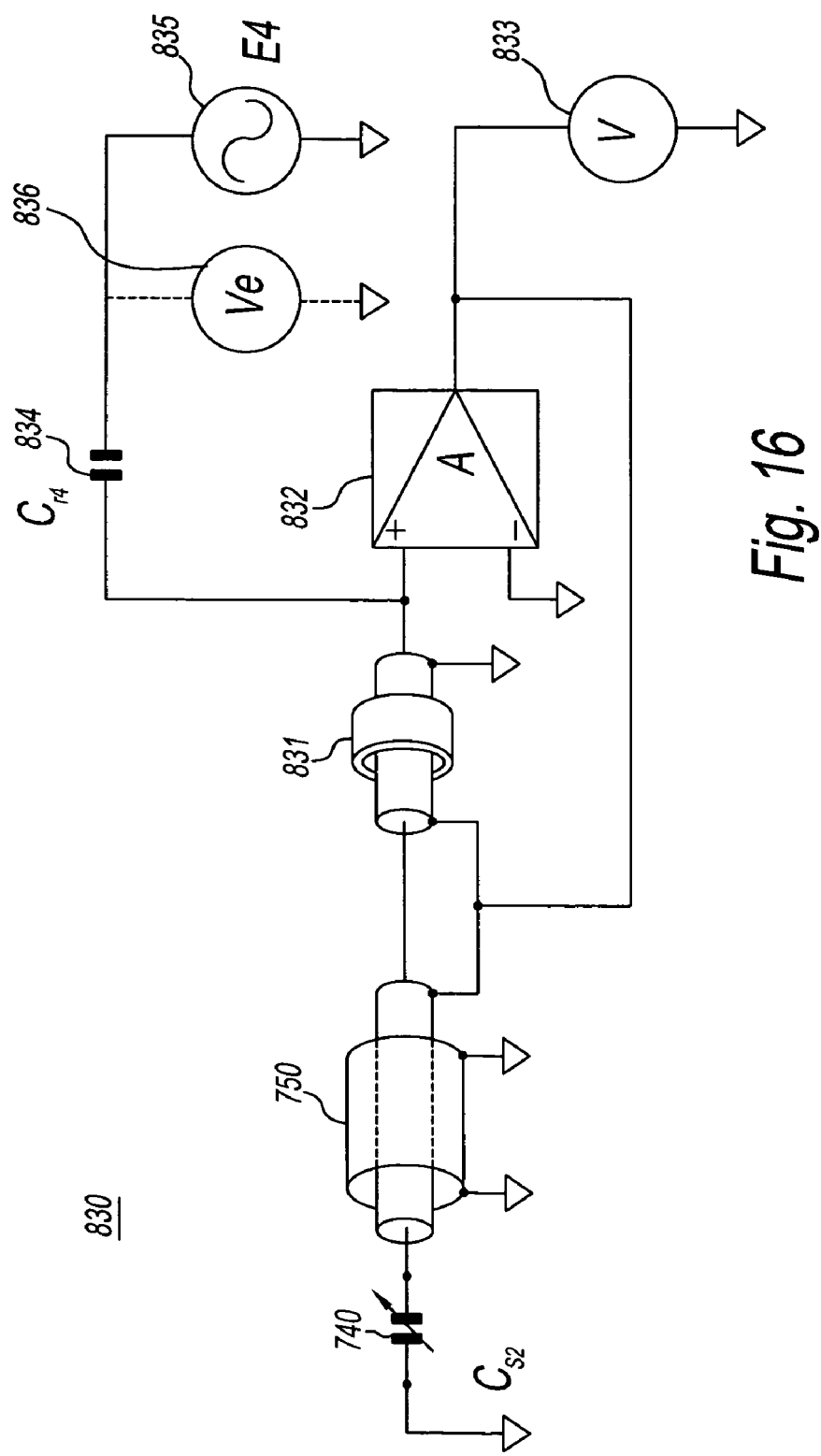
FIG. 16 is a drawing showing capacity-voltage conversion circuit 830 of the present invention.
Figure 17:
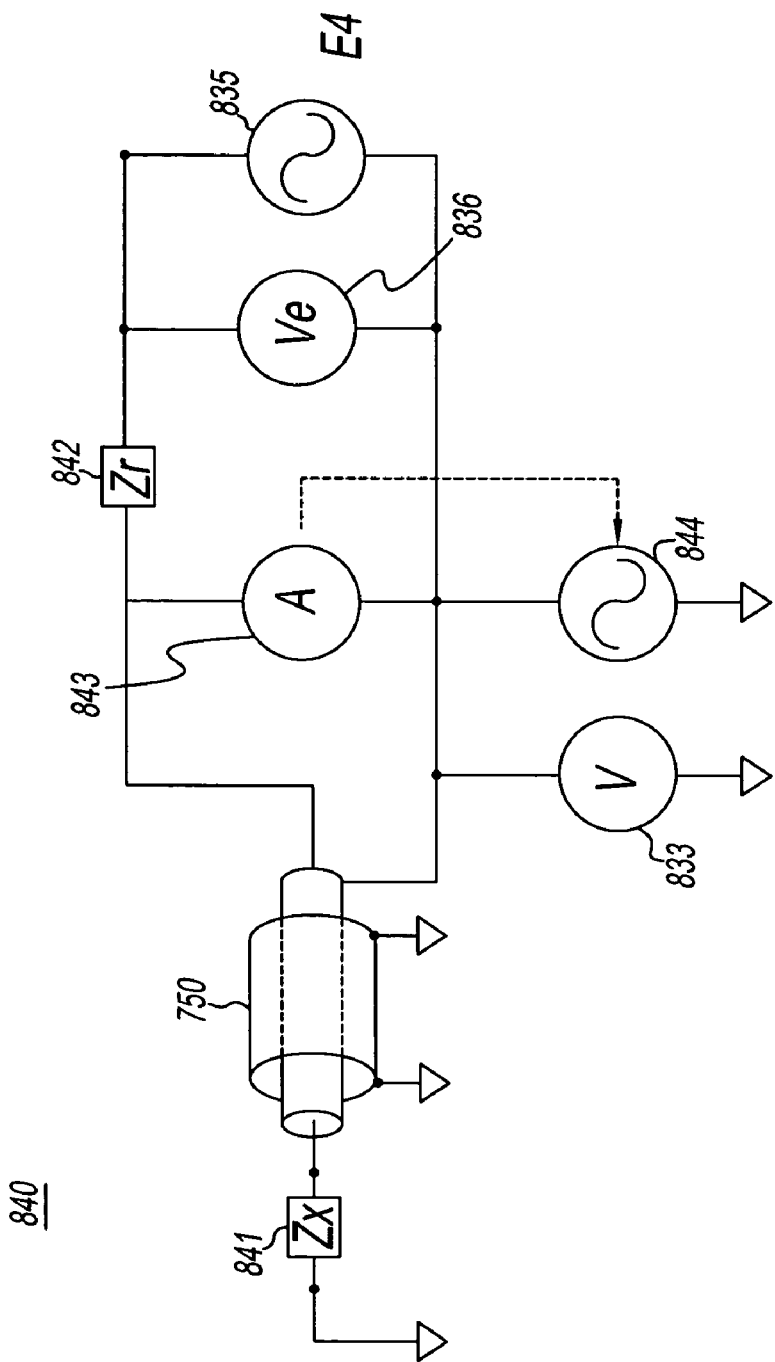
FIG. 17 is a drawing showing measuring apparatus 840 with a generalized capacity-voltage conversion circuit 830.

However, when capacity-voltage conversion circuit 830 is generalized, a measurement circuit 840 as shown in FIG. 17 is obtained. Capacitor 740 and reference capacitor 834 shown in FIG. 16 are replaced by a device under test 841 and a reference impedance component 842 shown in FIG. 17. Moreover, amplifier 832 shown in FIG. 16 is replaced by an ammeter 843 and a variable voltage source 844 shown in FIG. 17. Variable voltage source 844 in FIG. 17 controls the output voltage so that the measurement of ammeter 843 is zero. The fact that the measurement of ammeter 843 becomes zero means that the potential difference between the terminals of ammeter 843 becomes zero and therefore, ammeter 843 can also be replaced by a voltmeter 845 (not illustrated). In this case, variable voltage source 844 controls the output voltage such that the measurement of voltmeter 845 becomes zero. Measuring apparatus 840 obtains voltage V4 proportional to the current flowing to the device under test. V4 is the voltage that is measured by voltmeter 833 as described above. Voltage V4 is obtained as in the following formula. $V4=(Zx/Zr) \cdot E3$. Here Zx is the impedance of device under test 841. Zr is the impedance of reference impedance component 842. E3 is the output voltage of signal source 835. As described above, voltage V4 is obtained as the voltage proportional to the impedance Zx of device under test 841.

What is claimed is:

1. A moveable apparatus comprising:
   a movable part having a first electrode;
   a stationary part having a second electrode, wherein said first and second electrodes constitute a capacitor; and
   wherein said second electrode is enclosed in a guard electrode with a first insulator in between such that said second electrode can detect the amount of movement of said moveable part from changes in the electrostatic capacity of said capacitor;
   wherein said movable apparatus is connected to one terminal of a triaxial cable comprising a first or core conductor, a second conductor covering said first conductor, and a third conductor covering said second conductor, said first electrode is connected to said third conductor, said second electrode is connected to said first conductor, and said guard electrode is connected to said second conductor;
   a fourth conductor disposed in said stationary part, wherein said fourth conductor is insulated from said guard electrode and is electrically connected to said first electrode, and
   wherein said second electrode, said guard electrode, and said fourth conductor together form a triaxial structure.

2. The moveable apparatus according to claim 1, wherein said moveable apparatus is further connected to one terminal of a triaxial cable comprising a first or core conductor, a second conductor covering said first conductor, and a third conductor covering said second conductor;
   said first electrode is connected to said third conductor;
   said second electrode is connected to said first conductor;
   said guard electrode is connected to said second conductor; and
   said fourth electrode is connected to said third conductor.

3. The moveable apparatus according to claim 1, wherein said stationary part supports said moveable part with conductive support means for electrically connecting said fourth conductor and said first electrode.

4. The moveable apparatus according to claim 1, wherein said fourth conductor encloses said guard electrode with a second insulator in between.

5. A measuring apparatus connected to a terminal of a triaxial cable comprising a first or core conductor, a second conductor covering said first conductor, and a third conductor covering said second conductor, with a device under test being connected between the first conductor and third conductor at the other terminal of the triaxial cable; and wherein said measuring apparatus comprises:
- a reference impedance component disposed between said first conductor and said second conductor of said terminal of said triaxial cable,
- a signal generator disposed between said reference impedance component and said second conductor of said terminal of said triaxial cable,
- a voltage generator disposed between said second conductor and said third conductor of said terminal of said triaxial cable for controlling an output voltage such that the potential difference between said first conductor and said second conductor of said terminal of said triaxial cable is zero, and
- a first voltage measurement device disposed between said second conductor and said third conductor of said terminal of said triaxial cable.

6. The measuring apparatus according to claim 5, wherein said third conductor of said triaxial cable is grounded.

7. The measuring apparatus according to claim 5, further comprising a second voltage measuring device for measuring said output voltage of said signal generator.

8. An electrostatic capacitive distance sensing apparatus which is connected to a first terminal of a triaxial cable comprising a first or core conductor, a second conductor covering said first conductor, and a third conductor covering said second conductor, with a capacitor being connected in between said first conductor and said third conductor at a second terminal of said triaxial cable; wherein said electrostatic capacitive distance sensing apparatus comprising:
- a reference impedance component disposed between said first conductor and said second conductor of said first terminal of said triaxial cable,
- a signal generator disposed between said reference impedance component and said second conductor of said first terminal of said triaxial cable,
- a voltage generator disposed between said second conductor and said third conductor of said first terminal of said triaxial cable for controlling an output voltage such that the potential difference between said first conductor and said second conductor of said first terminal of said triaxial cable is zero, and
- a first voltage measuring device disposed between said second conductor and said third conductor of said first terminal of said triaxial cable; wherein the voltage that corresponds to the distance between the electrodes constituting said capacitor can be detected.

9. The electrostatic capacitive distance sensing apparatus according to claim 8, wherein said third conductor of this triaxial cable is grounded.

10. The electrostatic capacitive distance sensing apparatus according to claim 8, further comprising a second voltage measuring means for measuring said output voltage of said signal generator.

11. The electrostatic capacitive distance sensing apparatus according to claim 8, wherein said reference impedance component is a reference capacitor.

12. A positioning device that comprises a movable mechanism connected to the first end of a triaxial cable, which comprises a first core conductor, a second conductor covering said first conductor, and a third conductor covering said second conductor, and a capacitive distance sensing apparatus,
- wherein said movable mechanism comprises a movable part having a first electrode that forms a capacitor and a stationary part having a second electrode that forms said capacitor,
- wherein said second electrode is enclosed by a guard electrode with a first insulator in between,
- wherein said first electrode is connected to said third conductor at a first end,
- wherein said second electrode is connected to said first conductor at a first end,
- wherein said guard electrode is connected to said second conductor at a first end,
- wherein said capacitive distance sensing apparatus comprises a standard impedance component between the first conductor and the second conductor at a second end, a signal generator disposed between said standard impedance component and said second conductor at said second end, a voltage generator that controls the output voltage so that a potential difference between said first conductor and said second conductor at said second end is brought to zero in between said second conductor and said third conductor at a second end, and a voltage measurement unit disposed between said second conductor and said third conductor at a second end, and
- wherein said positioning device is such that a voltage corresponding to the distance between said first electrode and said second electrode can be detected.

13. The positioning device according to claim 12, wherein said stationary part comprises a fourth conductor which is insulated from said guard electrode and electrically connected to said first electrode, and wherein said stationary party is connected to said third conductor at said second end.

* * * * *